(12) United States Patent
Kramer

(10) Patent No.: US 6,494,297 B1
(45) Date of Patent: Dec. 17, 2002

(54) LOW COST BRAKE SENSOR

(75) Inventor: Dennis A. Kramer, Troy, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/293,244

(22) Filed: Apr. 16, 1999

(51) Int. Cl.⁷ .............................................. F16D 66/00
(52) U.S. Cl. ................................................. 188/1.11 L
(58) Field of Search ........................... 188/1.11, 1.11 R, 188/1.11 W, 1.11 L, 1.11 E; 340/485, 484

(56) References Cited

U.S. PATENT DOCUMENTS

| | | | |
|---|---|---|---|
| 3,088,549 A | | 5/1963 | Borsa |
| 3,556,258 A | * | 1/1971 | Winge .......................... 188/1 |
| 3,674,114 A | | 7/1972 | Howard |
| 4,241,603 A | | 12/1980 | Han et al. |
| 4,391,350 A | * | 7/1983 | Moriya ....................... 188/1.11 |
| 4,869,350 A | * | 9/1989 | Fargier et al. ............. 188/1.11 |
| 5,015,990 A | * | 5/1991 | Reede ......................... 340/454 |
| 5,133,431 A | * | 7/1992 | Braun ........................ 188/1.11 |
| 5,151,681 A | | 9/1992 | Valmir et al. |
| 5,839,545 A | * | 11/1998 | Preston et al. .......... 188/1.11 L |
| 6,193,020 B1 | * | 2/2001 | Takanashi et al. ...... 188/1.11 L |

* cited by examiner

Primary Examiner—Douglas C. Butler
Assistant Examiner—Bradley T King
(74) Attorney, Agent, or Firm—Carlson, Gaskey & Olds

(57) ABSTRACT

A low cost brake sensor incorporates a sensor portion extending through one of the rivet holes in the backing plate of the brake pad. A locking sleeve snaps onto the sensor portion and secures the sensor to the backing plate. Preferably, the locking sleeve has a lip which snaps into a groove in an outer periphery of a sensor portion. The present invention thus provides a relatively low cost and secure way for attaching the sensor to the brake pad. No modification of the lining or the backing plate is necessary.

8 Claims, 2 Drawing Sheets

LOW COST BRAKE SENSOR

BACKGROUND OF THE INVENTION

This invention relates to a relatively low cost sensor which is easily and securely mounted to a brake pad.

Brakes in modern vehicles typically include a replaceable brake pad with a friction material added to a metal backing plate. One main type of such brake pads is for use in a cam-type brake. In these type brakes, a brake table provides the backing plate and is generally curved along the circumference of a vehicle wheel. A friction material is formed on the top surface of the table and is selectively brought into contact with the wheel.

In another type of brake, a generally planar disc is selectively brought into contact with a rotating member. The discs have friction material formed on a backing plate.

In either type of brake, the friction material is typically riveted to the underlying metal backing plate. The friction material wears with use of the brake, and it is desirable to have a sensor for indicating when the friction material has worn. These sensors provide operator feedback of when the brake pads should be replaced. The sensors have used many diverse algorithms and techniques to identify wear.

In the past, monitoring the sensors have required relatively complex and expensive structures. Often the proposed sensors have necessarily changed the formation of the friction material or the backing plate. Further, the prior art sensors have often required expensive and unique electrical connectors.

As one example, the sensors have sometimes been threaded devices which require threading of the backing plate. This is expensive and undesirable. Some proposed sensors have been inserted through the lining in the brake, and thus require modification to the lining. Such sensors have often required a pigtail connector design, with the connector being attached by the brake pad manufacturer. Further, this type sensor has often required miniaturized connector designs. All of the above result in a brake that is undesirably expensive and less robust than would be desired.

SUMMARY OF THE INVENTION

In a disclosed embodiment of this invention, a sensor is attached to a hole in the backing plate, and most preferably, to one of the rivet holes in the backing plate. That is, one of the rivet holes which typically receives a rivet to secure the friction material to the plate is left without a rivet. The sensor is mounted in the rivet hole. The sensor preferably has an outer shoulder which abuts a rear; face of the backing plate, and a forwardly extending sensor portion extending through the hole in the backing plate. Preferably, the forwardly extending portion has an outer diameter that is smaller than the inner diameter of the hole.

The sensor is locked to the backing plate by a locking sleeve received on the sensor from the lining side of the backing plate. The locking sleeve has a shoulder portion which has an outer diameter greater than the inner diameter of the hole such that the locking sleeve abuts one side of the plate and captures the sensor. Preferably, the locking sleeve has a finger which snaps into a groove in the sensor securing the sensor to the sleeve. Most preferably, the finger and groove extend around the entire circumference of the sleeve and sensor portion.

The above-described sensor is relatively easy to assemble and is relatively inexpensive. These and other features of the present invention can be best understood from the following specification and drawings, the following which is a brief description.

DETAILED DESCRIPTION OF A PREFERRED EMBODIMENT

Figure 1:
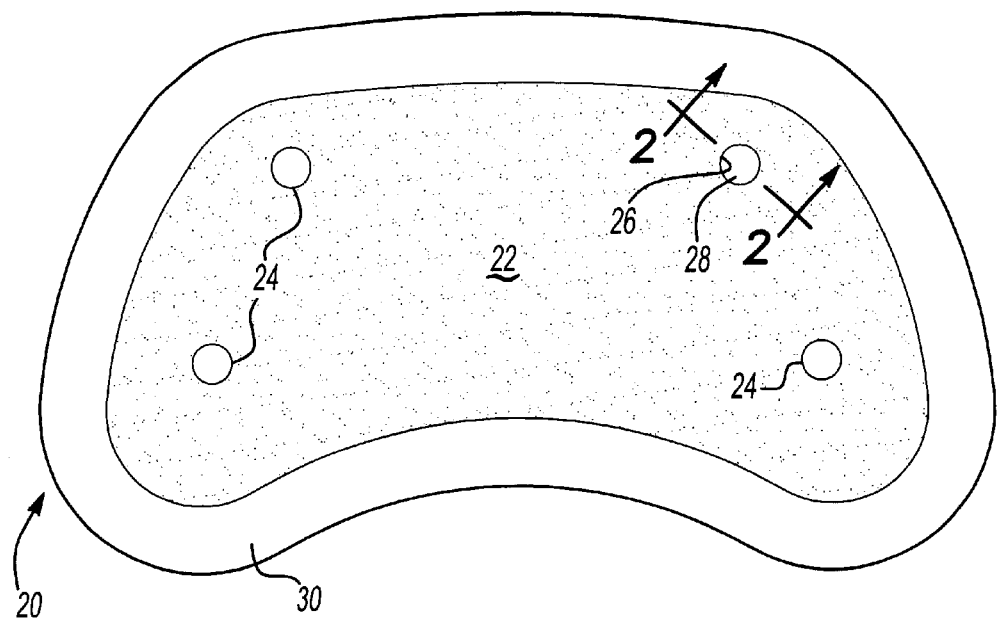
FIG. 1 is a plan view of an inventive brake pad.

FIG. 1 schematically shows a brake pad 20 incorporating a friction material face 22. A plurality of rivets 24 extend through holes in the friction material. One of the rivet holes is not provided with a rivet, but instead receives a sensor 26. Sensor 26 includes a sensor portion 28, as will be described below. Although a disc-type brake pad is shown, it should be understood this invention has equal application to cam-type brakes wherein the underlying backing plate is curved along the circumference of the wheel. Further, other type brake pads having a metal backing plate and a friction material would also benefit from this invention.

Figure 2:
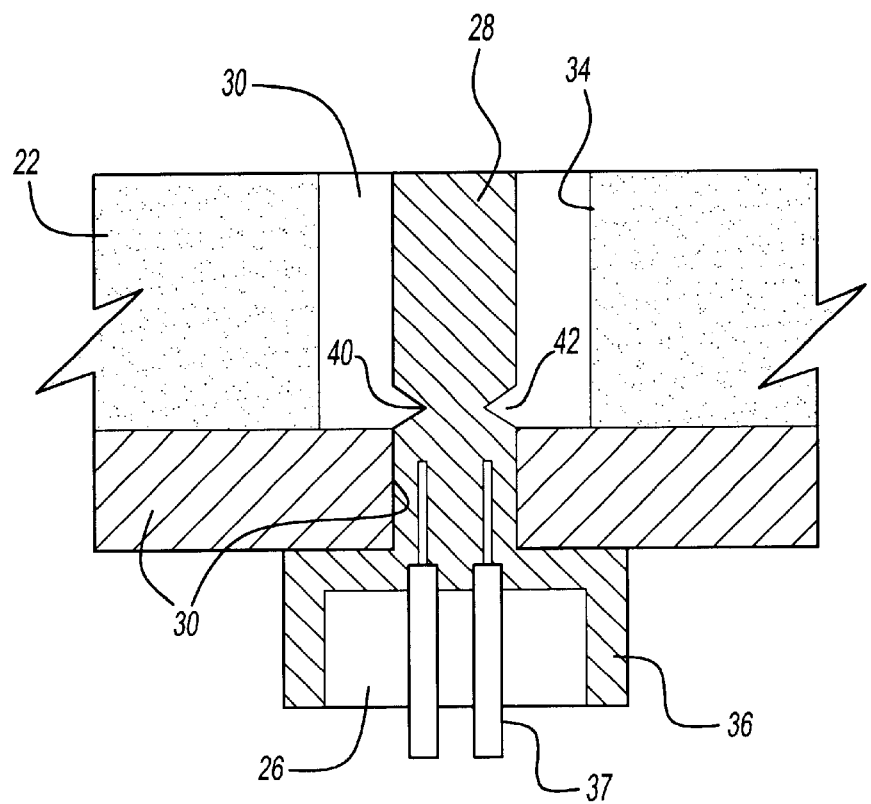
FIG. 2 is a cross-sectional view along line 2—2.

As shown in FIG. 2, the sensor 26 has its forwardly extending sensor portion 28 extending through a backing plate 30 formed behind the friction material 20. A hole 32 through the backing plate 30 has a first inner diameter, and a second space 34 within the friction material 22 has a second inner diameter which is greater than the inner diameter of the hole. While the friction material is shown as being removed completely from the backing plate 30 around the vicinity of the hole 32. it may be that some friction material may still be formed, although typically of a lesser height than the height at the areas outwardly of the hole 34.

As shown, an enlarged shoulder 36 has an outer diameter which is greater than the inner diameter of the hole 32. A standard connector 37 is formed outwardly of the shoulder 36 and can receive a standard electrical connector from a control. The use of the standard connectors facilitate the attachment of the sensor into the braking system, reduces the cost of the proposed system, and further, make the system more robust than the prior art.

A sleeve 38 formed of a material such that it has similar wear characteristics to the sensor portion 28, has a locking lip 40 which snaps into a groove 42 in the sensor portion 28. As can be appreciated, the sleeve 38 has an outer diameter which is greater than the inner diameter of the hole 32. Thus, the sleeve captures the sensor by having lip 40 snap into groove 42, and the sensor is thus easily secured to the brake pad 20.

Figure 3:
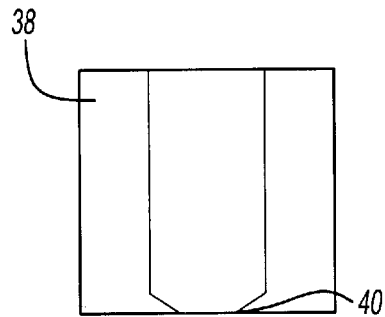
FIG. 3 is an exploded view of the sensor components of this invention.
Figure 3:
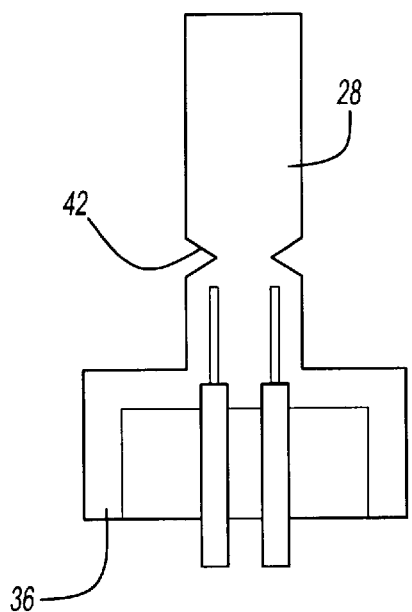

As can be appreciated from FIG. 3, the groove 42 extends around the entire circumference of the sensor portion 28 and the lip 40 also preferably extends around the entire circumference. The lip easily snaps into the groove as the sleeve is forced onto the sensor portion 28, and the sensor is thus securely held on the brake pad.

Figure 4:
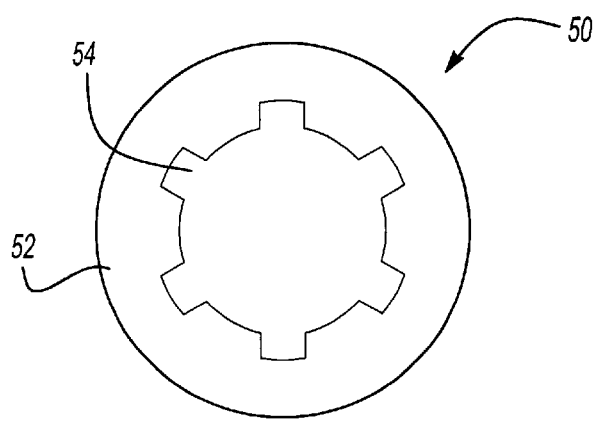
FIG. 4 shows a second embodiment.

FIG. 4 shows an alternative embodiment sleeve 50. In sleeve 50, rather than having a lip which extends around the entire circumference, there are a plurality of lip segments 52 separated by spaces 54. The lip segments may facilitate the snapping of the lip into the groove in certain instances. The size and number of segments can be modified to achieve a desired holding force.

The sensor portion 28 can be any one of several types of brake sensors, including those which have varying resistance with wear, or including the sort wherein a short circuit occurs with a predetermined amount of wear. This application goes to the packaging of the sensor, and not to the operational details.

Although a preferred embodiment of this invention has been disclosed, a worker in this art would recognize that certain modifications would come within the scope of this invention. For that reason, the following claims should be studied to determine the true scope and content of this invention.

What is claimed is:

1. A brake pad comprising:
a backing plate formed of a metal and having at least one hole extending therethrough;
a friction material formed on a first face of said backing plate, said friction material having a hole aligned with said hole in said backing plate; and
a sensor extending through said hole in said backing plate, said sensor having an enlarged shoulder with an outer diameter greater than an inner diameter of said hole and abutting a second face of said backing plate, a locking member attached to said sensor on said first face of said backing plate, said locking member locking said sensor to said backing plate;
said sensor has a small diameter sensor portion extending forwardly from said shoulder, said locking member being a sleeve surrounding said sensor portion; and
said locking member has a lip which snaps into a groove in an outer periphery of said sensor portion to lock said sensor portion to said backing plate.

2. A brake pad comprising:
a backing plate formed of a metal and having at least one hole extending therethrough;
a friction material formed on a first face of said backing plate, said friction material having a hole aligned with said hole in said backing plate;
a sensor extending through said hole in said backing plate, said sensor having an enlarged shoulder with an outer diameter greater than an inner diameter of said hole and abutting a second face of said backing plate, a locking member attached to said sensor on said first face of said backing plate, said locking member locking said sensor to said backing plate;
one of said sensor and said locking member has a groove and the other has a lip which snaps into said groove;
said groove extends around the entire circumference of said sensor member; and
said lip also extends around the entire circumference of said sensor member.

3. A brake pad, comprising:
a backing plate formed of a metal and having at least one hole extending therethrough;
a friction material formed on a first face of said backing plate, said friction material having a hole aligned with said hole in said backing plate; and
a sensor extending through said hole in said backing plate, said sensor having
an enlarged shoulder with an outer diameter greater than an inner diameter of said hole and abutting a second face of said backing plate,
a locking member attached to said sensor on said first face of said backing plate, said locking member locking said sensor to said backing plate, wherein said locking member has a bore through which said sensor extends, and
a sensor portion that passes through said hole in said backing plate, wherein said sensor portion has a greatest outer diameter that is smaller than an inner diameter of said bore in said locking member such that said sensor can be inserted through said bore in said locking member and said locking member may then be mounted onto said sensor, said locking member not extending to an axial position aligned with said enlarged shoulder such that said enlarged shoulder is integrated with an outer periphery of said sensor,
wherein said locking member has an outer diameter that is greater than said inner diameter of said hole in said backing plate such that said locking member abuts said first face of said backing plate,
wherein one of said sensor and said locking member has a groove and the other has a lip which snaps into said groove and formed of a plurality of circumferentially spaced segments, the lip and the groove extending around the entire circumference of said sensor member.

4. A brake pad comprising:
a backing plate formed of a metal and having a at least one hole extending therethrough;
a friction material formed on a first face of said backing plate, said friction material having a hole aligned with said hole in said backing plate; and
a sensor extending through said hole in said backing plate, said sensor having an enlarged shoulder with an outer diameter greater than an inner diameter of said hole and abutting a second face of said backing plate, a locking member attached to said sensor on said first face of said backing plate, said locking member locking said sensor to said backing plate, said locking member being a sleeve having a lip snapping into a groove in said sensor.

5. A brake pad as recited in claim 4, wherein said lip extending around the entire circumference of said groove.

6. A brake pad as recited in claim 4, wherein said lip is formed of a plurality of circumferentially spaced segments.

7. A brake pad as recited in claim 4, wherein electrical communication lines extend through said shoulder and from said sensor.

8. A brake pad as recited in claim 7, wherein said electrical communication lines extend to an electrical connector at an outer face of said shoulder.

* * * * *